United States Patent

[11] 3,582,705

[72] Inventors Robert W. Waller
Northridge;
James F. Gruder, Manhattan Beach, both of, Calif.
[21] Appl. No. 841,705
[22] Filed July 15, 1969
[45] Patented June 1, 9171
[73] Assignee Information International, Inc.
Boston, Mass.

[54] VECTOR DISPLAY SYSTEM
11 Claims, 4 Drawing Figs.
[52] U.S. Cl. .................................................... 315/18
[51] Int. Cl. .............................................. H01j 29/70
[50] Field of Search ............................................ 315/18

[56] References Cited
UNITED STATES PATENTS
3,320,409  5/1967  Larrowe .................... 315/18
3,510,865  5/1970  Callahan et al. ............... 315/18X Primary Examiner—Richard A. Farley
Assistant Examiner—Brian L. Ribando
Attorneys—Samuel Lindenberg and Arthur Freilich ABSTRACT: A vector display system is disclosed for use with CRT and similar devices which display a line in a coordinate system. A ramp voltage is multiplied by scaled departure components $\Delta X$ and $\Delta Y$ to assure straight lines, and the ramp rate is selected by an approximation of the line length computed digitally. The ramp voltage is backed up to initially deflect the beam in the opposite direction before ramp generation is initiated and video is turned on. The video-on and video-off times are delayed by constant amounts to allow for lag of the beam deflection system behind the beam deflection signals generated from the sum of analog signals representing present position, and the product of departure data and the ramp voltage. Video turn off is initiated when the ramp voltage crosses a reference which is scaled by the reciprocal of the scaling factor used for the components $\Delta X$ and $\Delta Y$.

VECTOR DISPLAY SYSTEM

BACKGROUND OF THE INVENTION

This invention relates to systems for the visual display of data, and more particularly to a cathode-ray tube (CRT) system for displaying straight lines defined by digital input data in a conventional rectangular coordinate system.

At least one general function to be performed by apparatus of the present invention is to electronically display straight lines by storing rectangular (X,Y) coordinate data in digital form, and multiplying a linear ramp voltage that increases from zero to a reference level by the stored data to obtain deflection signals which move the beam from its present position to a new position as specified by the coordinate data. Once the end point is reached, the present position data is updated to complete a line display cycle. Another cycle can be initiated after sufficient time has elapsed for the CRT circuits to settle at the new position.

The ramp voltage, multiplied by numbers proportional to $\Delta X$ and $\Delta Y$, controls the velocity at which the beam is deflected with respect to each axis from its present position to its new position. By using the same ramp voltage for both the X and Y axis, the correct relationship is maintained in the position and velocity of the beam as it is deflected in each axis from the present to the new position so that the beam arrives at the end point of each axis at the same time, i.e. so that it moves to its new position in a straight line. However, since the apparent intensity of a CRT display is inversely proportional to the vectorial velocity at which the beam transverses the face of the CRT, that velocity must be controlled for all line lengths (i.e. vector sums of $\Delta X$ and $\Delta Y$ components). That is accomplished by so controlling the ramp voltage rate that the vectorial velocity of the line will be constant. Then the electron beam intensity need not be controlled to maintain line intensity constant.

A direct approach to beam velocity problems is to simply make the ramp rate inversely proportional to the length of the line being drawn by computing the reciprocal of the square root of the sum $\Delta X^2 + \Delta Y^2$, and controlling ramp rate as a function of the square root. However, the mechanization of a square root computer is complex, and the required variation in ramp rate is so large that the total system speed would be seriously limited.

With the beam velocity maintained constant, the only control on the beam intensity required is an unblanking signal to turn it on when generation of the ramp voltage is initiated, and to turn it off when the ramp voltage has reached a predetermined reference level. That reference level remains the same while the ramp rate is being varied to achieve constant beam velocity.

If a high ramp rate is applied to the deflection system, the electron beam position will lag the deflection signals by a fixed time, particularly in CRTs having magnetic deflection systems, and it will take some time before the beam velocity is equal that called for by the ramp rate. While the fixed time error may be handled by delaying the turn-on and turn-off times of the electron beam by a constant amount, the initial difference in velocity presents a more difficult problem since the slower velocity at the beginning will cause greater line intensity, thereby producing teardropping and bending of the line at the start.

While systems have been devised which deal with some of these problems of displaying straight lines between two points on the face of a CRT, such as a system disclosed in U.S. Pat. No. 3,320,409 granted May 16, 1967 to B. T. Larrowe, the efficiency and effectiveness of solutions have in the past left much to be desired. Accordingly, an object of the present invention is to provide more efficient and effective CRT system for displaying straight lines defined by digital input data in a conventional rectangular coordinate system.

SUMMARY OF THE INVENTION

In accordance with the present invention, straight lines are displayed on a CRT by multiplying scaled rectangular coordinate departure data ($\Delta X$, $\Delta Y$) in digital form with a ramp voltage which starts slightly above or below zero (in the direction opposite to the direction the line is to be drawn) through separate multiplying digital-to-analog converters (MDACs). A zero-level detector determines when the ramp voltage passes through zero volts and generates a video-on signal. A delay circuit responds to the video-on signal to turn on an unblanking signal generator (or turn off a blanking signal generator) after a fixed time delay. In the meantime, the outputs of the MDACs are summed with corresponding outputs of digital-to-analog converters (DACs) which have as their inputs coordinate data (X,Y) of the starting point for the line to be drawn. Once the unblanking pulse is generated, the desired trace is made on the CRT in a straight line without teardropping or bending at the start. After the ramp voltage reaches a predetermined level, a second level detector generates a video-off signal. A delay circuit responds to the video-off signal to turn off the unblanking signal generator after the same or greater fixed time delay as the delay introduced in turning the unblanking signal generator on. This delay at turn-on and turn-off of video compensates for CRT beam lag in the response of its deflection system to the sum of the outputs of the associated MDACs and DACs.

For substantially constant intensity of a line being displayed, the ramp voltage rate is selected to be inversely proportional to an approximation of the length of the line to be displayed. The approximation is made by determining which departure component $\Delta X$ or $\Delta Y$ is larger and forming a composite digital word of a predetermined number of the most significant digits of the largest component L and a predetermined number of the most significant digits of the remaining component S, and applying the composite LS to the ramp generator which comprises a constant current source driving a bank of integrating capacitors selected by the composite LS. The capacitors are of different sizes according to the weight of the component L digits and according to approximately 0.375 of the weight of the component S digits, where the most significant digit of the component L sets the nominal size which all other capacitors are scaled down.

This approximation method is more economical and efficient than to compute the line length and control ramp rate to be inversely proportional. However, it requires a very large range of ramp rates. To relax the dynamic range requirements on analog circuits, the departure components $\Delta X$ and $\Delta Y$ are scaled upon transferring them into associated MDACs. Then to terminate the line at the correct point, the level of the ramp voltage at which the video is turned off is scaled correspondingly. Thus, if the components $\Delta X$ and $\Delta Y$ are scaled up by multiplying by a factor N, the ramp termination voltage level is scaled down by dividing by a factor N.

Scaling of the components $\Delta X$ and $\Delta Y$ is efficiently accomplished by effectively shifting the components the necessary number of places at the time of transfer to MDACs through gates effectively selected by the scaling factor employed. When scaling is used, control of the ramp rate is in accordance with the scaled departure components. In the approximation technique referred to hereinbefore, that is most efficiently accomplished by selecting L and S digits from the scaled components in the MDACs.

The novel features that are considered characteristic of this invention are set forth with particularity in the appended claims. The invention will best be understood from the following description when read in connection with the accompanying drawings.

DESCRIPTION OF PREFERRED EMBODIMENTS

The techniques, and organization of an exemplary system employing the techniques of the present invention, will now be described with reference to the drawings. However, although particular implementations of various features will be suggested, it should be understood that all of the features to be referred to may be implemented in several different ways. The choice to be made for a particular implementation of a given feature will depend upon the particular environment and operating requirements of the CRT display system employing it.

Figure 1:
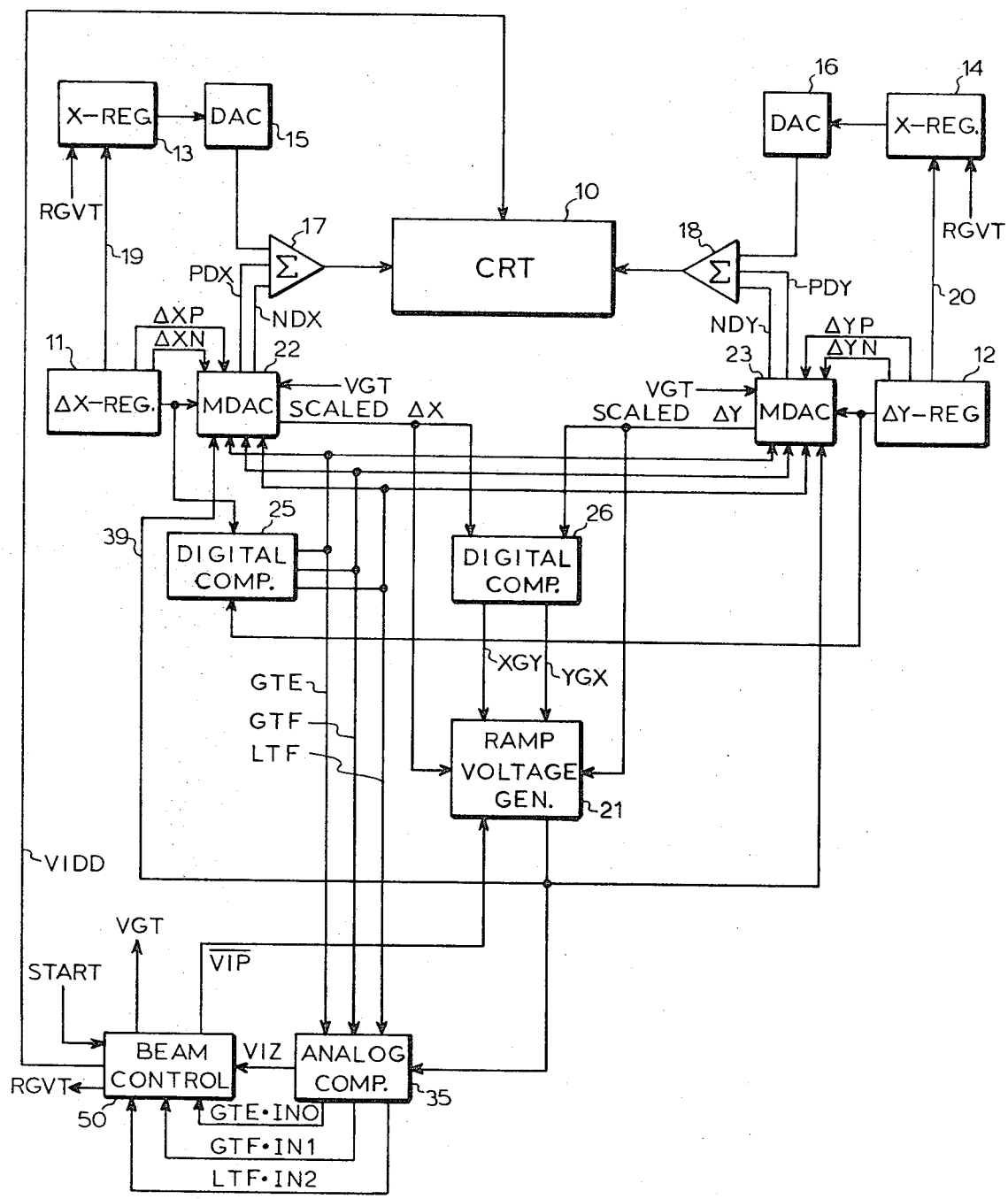
FIG. 1 illustrates an exemplary arrangement for a preferred embodiment of the present invention.

Referring now to FIG. 1, the overall function of the present invention is, as noted hereinbefore, to generate X and Y deflection signals required to position the electron bema of a CRT, or similar display device, to a specified position and generate $\Delta X$ and $\Delta Y$ deflection signals and to generate video on and off signals to display a line from the present beam position to a new position. The system employing the present invention will have means for computing or receiving new position coordinates, either in the absolute form as X and Y coordinate data, or in a relative form as $\Delta X$ and $\Delta Y$ departure data relative to the present position.

For simplicity in understanding the present invention, it is assumed that new position coordinates are received in a relative form, such as from a digital computer, and stored in $\Delta X$- and $\Delta Y$-registers 11 and 12 while the present position is stored in X and Y registers 13 and 14. It will also be assumed that all values are binary expressed in "sign magnitude" form with the origin of the coordinate system at the lower left corner of the CRT so that all present position data for points on the face of the CRT will be positive while departure data may be positive or negative, depending upon the direction of the line to be displayed.

For simple repositioning, new X and Y coordinate data are received in the respective registers 13 and 14. The parallel outputs from those registers are employed to drive conventional digital-to-analog converters (DACs) 15 and 16. The outputs of the DACs are the respective X and Y deflection signals applied to the deflection system of the CRT via respective summing amplifiers 17 and 18. A repositioning operation is considered complete after the DACs are updated and sufficient time has elapsed for the CRT circuits to settle. The electron beam is deflected as fast as the CRT circuits will allow. After the CRTs have settled, a point can be plotted at the new position by turning the video (electron beam) on (having turned it off when deflection was initiated), or another operation can be initiated.

For line drawing, it is necessary to control the manner in which the beam is deflected (in response to departure data received by the registers 11 and 12) in such a manner that the line will be straight and of uniform intensity. This requires so interpolating the rates of the X and Y deflections that they will arrive at a point of completion at the same time. If that is accomplished, the beam moves to its new position in a straight line. After reaching the new position, the present position data are updated by adding the contents of the $\Delta X$- and $\Delta Y$-registers to the contents of the X- and Y-registers. That may be accomplished by counting the X- and Y-registers up, and down, depending on the signs of the departure data as the $\Delta X$- and $\Delta Y$-registers to the contents of the X- and Y-registers. That may be accomplished by counting the X- and Y-registers up, or down, depending on the signs of the departure data as the $\Delta X$ and $\Delta Y$-registers are decremented to zero. Suitable up-down counters are commercially available. Alternatively, all registers may be provided as simply banks of, for example, D-type flip-flops with updating accomplished through a bank of full adders. Either form of implementation is represented in FIG. 1 by updating busses 19 and 20.

Effectively interpolating the rates of X and Y deflections is accomplished by a ramp voltage generator 21 which transmits a ramp signal to multiplying digital-to-analog converters (MACs) 22 and 23 which receive $\Delta X$ and $\Delta Y$ data through scaling gates where they are multiplied by, for example 1, 8 or 64 according to the criteria set forth in the following table.

| Criteria | Mult. | Control |
|---|---|---|
| $\|\Delta X\|$ or $\|\Delta Y\| \geq 200\|_8$ | 1 | GTE |
| $\|\Delta X\|$ and $\|\Delta Y\| < 200\|_8$ and $\|\Delta X\|$ or $\|\Delta Y\| > 017\|_8$ | 8 | GTE |
| $\|\Delta X\|$ and $\|\Delta Y\| \leq 017\|_8$ | 64 | LTF |

The result of this scaling operation is that the digital input of at least one of the MDACs will be $\geq \pm 200_8$, where the subscript indicates a binary number expressed in octal form. A digital comparator network 25 receives the $\Delta X$ and $\Delta Y$ data (without signs) and generates the control signals GTE, GTF and LTF.

The network 25 may be comprised of four static comparators for making the decisions $\Delta X > 200|_8$, $\Delta Y > 200|_8$, $\Delta X > 017|_8$ and $\Delta Y > 017|_8$ to provide signals A, B, C and D respectively. Logic gates may then form the scaling factor control signals according to the following logic equations:

$$GTE = A + B$$

$$GTF = \overline{A} \cdot \overline{B} (C + D)$$

$LTF = \overline{C} \cdot \overline{D}$ To implement a comparator for "greater than or equal to octal 200", all but the lower 7-bit positions of the number being compared may be ORed, and for "greater than octal 017", all but the four least significant bit positions may be ORed. The complement of a signal, such as $\overline{A}$, would of course be provided by an inverter at the output of the comparator.

The reason for scaling is to relax the ramp rate range of the ramp generator 21 which is employed to so vary ramp rate as to maintain the beam velocity constant. For constant beam velocity without scaling, it would be necessary to make the ramp rate inversely proportional to the length of the line being drawn according to the following equation:

$$\text{Ramp Rate} \simeq \frac{1}{\sqrt{X^2 + Y_2}}$$

That would require a very large range of ramp rates (about 1400:1 for 10 bit numbers exclusive of the sign). Scaling reduces the ramp rate range to abut 10:1.

As noted hereinbefore, the actual ramp rate used for given components $\Delta X$ and $\Delta Y$ is inversely proportional to the largest component plus three-tenth to four-tenth the smallest component. When the components have been scaled, the scaled values are used for the ramp rate selection. Accordingly, the MDACs are provided with storage registers which can provide the scaled $\Delta X$ and $\Delta Y$ values. To determine which is greater, the most significant 4bits of the MDAC registers are compared in a digital comparator 26, and if the scaled $\Delta X$ is greater than the scaled $\Delta Y$, a signal on a line XGY gates the five most significant digits $MX_1$ to $MX_5$ of the scaled $\Delta X$ into the ramp generator 21 from the MDAC 22 as the L-digits and gates the four most significant digits $MY_1$ to $MY_4$ of scaled $\Delta Y$ into the ramp generator 21 from the MDAC 23 as the S-digits to form the composite which make up the approximation of the length of the line, but scaled to relax the dynamic range requirements of the analog circuits which process the ramp voltage. Conversely, if the scaled $\Delta Y$ is determined to be greater than scaled $\Delta X$, a signal on a line YGX gates digits from the MDACs 23 and 22 into the ramp generator 21 as the respective L and S digits. The L and S digits select integrating capacitors in the ramp generator 21.

Figure 2:
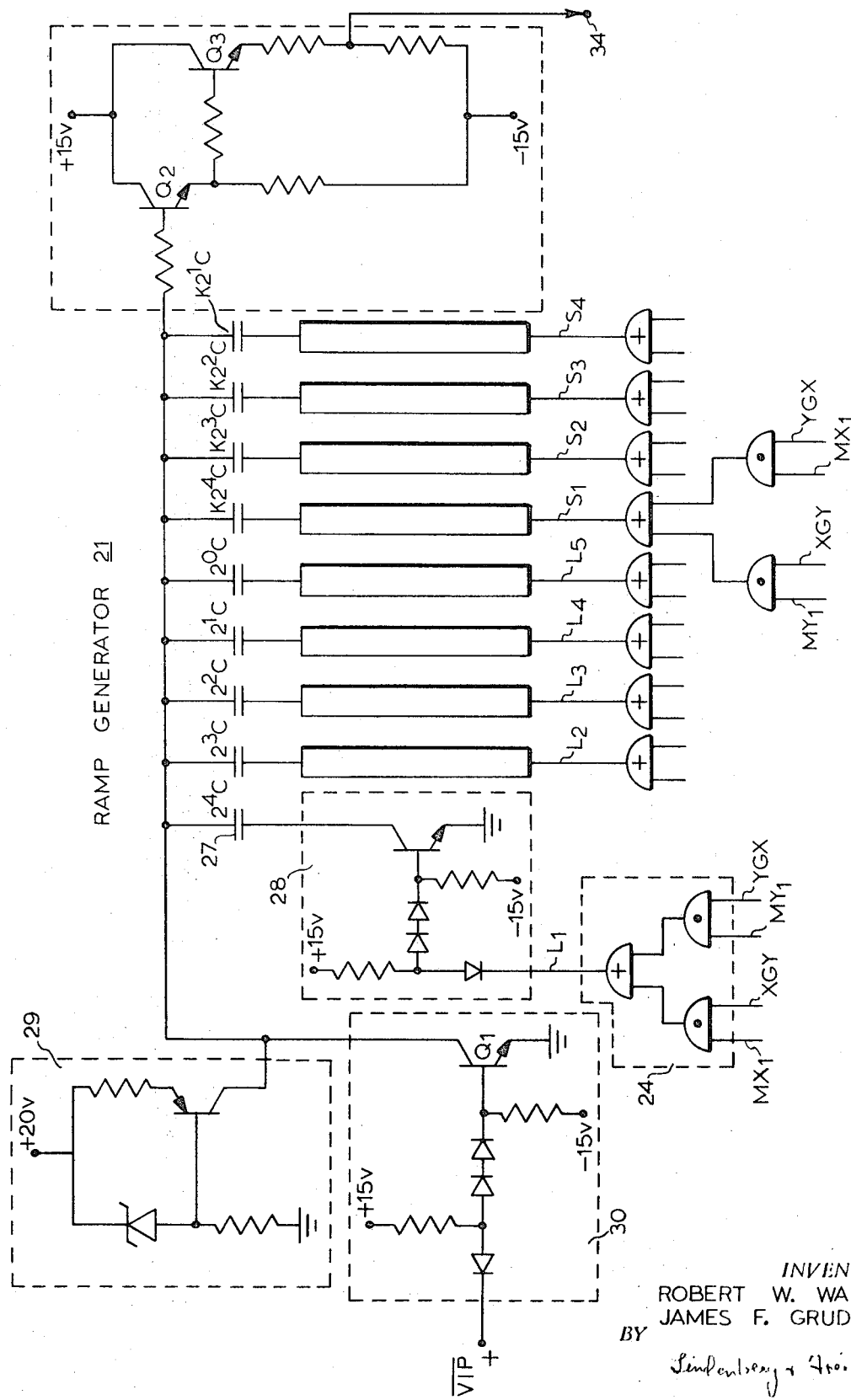
FIG. 2 illustrates schematically an exemplary ramp generator for the arrangement of FIG. 1.

In a preferred embodiment of the ramp generator 21 shown in FIG. 2, the L and S digits are entered through groups of selecting gates, such as gates 24, in response to XGY and YGX signals. The ramp generator itself comprises a plurality of capacitors, such as capacitor 27, a plurality of switches responsive to the L and S digits, such as a switch 28, a constant current source 29, and a shunt switch 30. Each switch, such as switch 30, consists of an NPN transistor $Q_1$ and a bias network which turns the transistor on in response to a positive input signal. In the case of the switch 30, the input signal $\overline{VIP}$ is positive until ramp generation is initiated, thereby shunting current from the source 29 to ground. In the case of the other switches, the L and S digit signals are positive when equal to binary 1 to turn on the switch and thereby connect an associated capacitor to ground.

The capacitors selected by the L digits $L_0$ to $L_5$ and the S digits $S_1$ to $S_4$ are weighted in accordance with the binary weight of the digits in each group. Thus, for the L digits, the capacitors selected by digits $L_1$ to $L_5$ weighted $2^4C$, $2^3C$, $2^2C$, $2^1C$ and $2^0C$ while the capacitors selected by digits $S_1$ to $S_4$ are weighted $K2^4C$, $K2^3C$, $K2^2C$ and $K2^1C$, where C is a constant such as 8,000 picofarads, and K is a constant equal to about 0.35. When selected capacitors are connected in parallel between the output of the current source 29 and ground, their capacitances are added so that the ramp rate can be said to be inversely proportional to the weighted sum of the L digits plus 0.35 times the weighted sum of the S digits. This relationship can be conveniently expressed as ramp rate $RR=1/L+0.35S$ where $L+0.35S$ is an approximation of the line length.

The selection of the capacitors is made before a signal VIP is set true (positive), at which time the complementary signal $\overline{VIP}$ goes to zero to turn off the switch 30. The voltage output of the capacitors then increases at a rate inversely proportional to the line length.

The ramp voltage from the capacitors in the ramp generator 26 is connected to an emitter follower circuit 31 comprising two cascaded transistors $Q_2$ and $Q_3$. However, the ramp voltage is not applied to the deflection system through the summing amplifiers 17 and 18 until a flip-flop VGT (FIG. 4) is set. At this time the deflection system is backed up from its present position (established by the X- and Y-registers connected to the amplifiers 17 and 18) in a direction opposite that of the line to be displayed. The backup voltage is provided by the ramp generator in response to a control signal $\overline{VIP}$ which is driven true (positive) to turn the transistor $Q_1$ on, and thereby drive an output terminal 34 negative to about $-1.2$ volts determined by the base-emitter drops on transistors $Q_2$ and $Q_3$. Thereafter, when the control signal $\overline{VIP}$ is driven false, the transistor $Q_1$ is turned off and the integrating capacitors start to charge up. When the ramp voltage passes through zero, an analog comparator 35 (FIG. 1) produces a signal VIZ to initiate beam unblanking. Thus the ramp voltage is multiplied by scaled $\Delta X$ and $\Delta Y$ in the MDACs and applied to summing amplifiers 17 and 18 which provide the X and Y deflection of the electron beam in the right direction. This allows the difference in velocity between the input and the output of the deflection system to approach zero while the ramp voltage is increasing from $-1.2$ to 0 volts.

When the ramp voltage reaches zero, the signal VIZ sets a video-on signal VID in a beam control unit 50. The leading edge of the VID triggers a monostable multivibrator in that unit to produce a pulse LVD which delays turning the blanking signal of the CRT off (i.e. delays allowing the beam to pass onto the CRT face) for an appropriate period. This delay adjusts for a fixed time error or lag of the beam behind the deflection signals from the amplifiers 17 and 18. Thus, the backup feature of starting the ramp voltage at 1.2 volts overcomes teardropping and bending in the line due to an initially low beam velocity, and once the beam is up to an appropriate velocity (when ramp voltage is zero) the actual display of the line is delayed a fixed time to allow for the lag of the electron beam behind the deflection signals.

When the ramp voltage reaches a predetermined level the comparator 35 generates a signal which resets the signal VID. The trailing edge of the VID signal then triggers a monostable multivibrator which produces a pulse TVD that delays turning the blanking signal of the CRT back on for an appropriate period equal to or greater than the pulse LVD. This allows the lagging electron beam to reach the proper termination point on the CRT face before the line drawing operation is terminated. The exact delay required at each end of a line drawing operation can be determined for a particular CRT by simple experimentation using variable multivibrators. However, if the $\Delta X$ and $\Delta Y$ data applied to the MDACs have been scaled, the time at which the comparator 35 generates a signal to set the signal VID must be scaled accordingly.

To terminate the line at the correct point when no scaling has been introduced, the comparator 35 detects when the ramp voltage reaches a reference voltage of, for example 10 volts. When scaling has been introduced, it will be recalled that the $\Delta X$ and $\Delta Y$ data were multiplied by 8 or 64 upon transfer of that data from the registers 10 and 11 in response to GTF and LTF signals, respectively. Therefore, to avoid displaying lines that are too long by a factor of 8 or 64, the reference voltage of the comparator 35 is divided by a corresponding factor of 1, 8 or 64 to terminate the line being displayed when the ramp voltage reaches 1.0, 1.25 or 0.1565 volts according to whether the comparator 25 transmits a GTE, GTF or LTF signal.

Rather than implement the comparator 35 with a variable reference voltage, it is preferred to implement it with four separate differential amplifiers, one with a zero reference voltage to transmit the VIZ signal and the remaining three with the reference voltages of 10, 1.25 and 0.1565 to transmit IN0, IN1 and IN2 signals when the respective reference voltages are reached. However, only the appropriate one of the signals IN0, IN1 and IN2 is gated out to reset the signal VID in the control unit 50 in response to the output signals GTE, GTF and LTF from the comparator 25. Thus, the comparator 35 is "scaled down" to compensate for any scaling up of $\Delta X$ and $\Delta Y$ data in the MDACs. As noted hereinbefore, this scaling technique reduces the required ramp rate range of the ramp generator 21 by a factor of more than 100. The net result is more efficient and effective beam velocity control through ramp rate variation.

Figure 3:
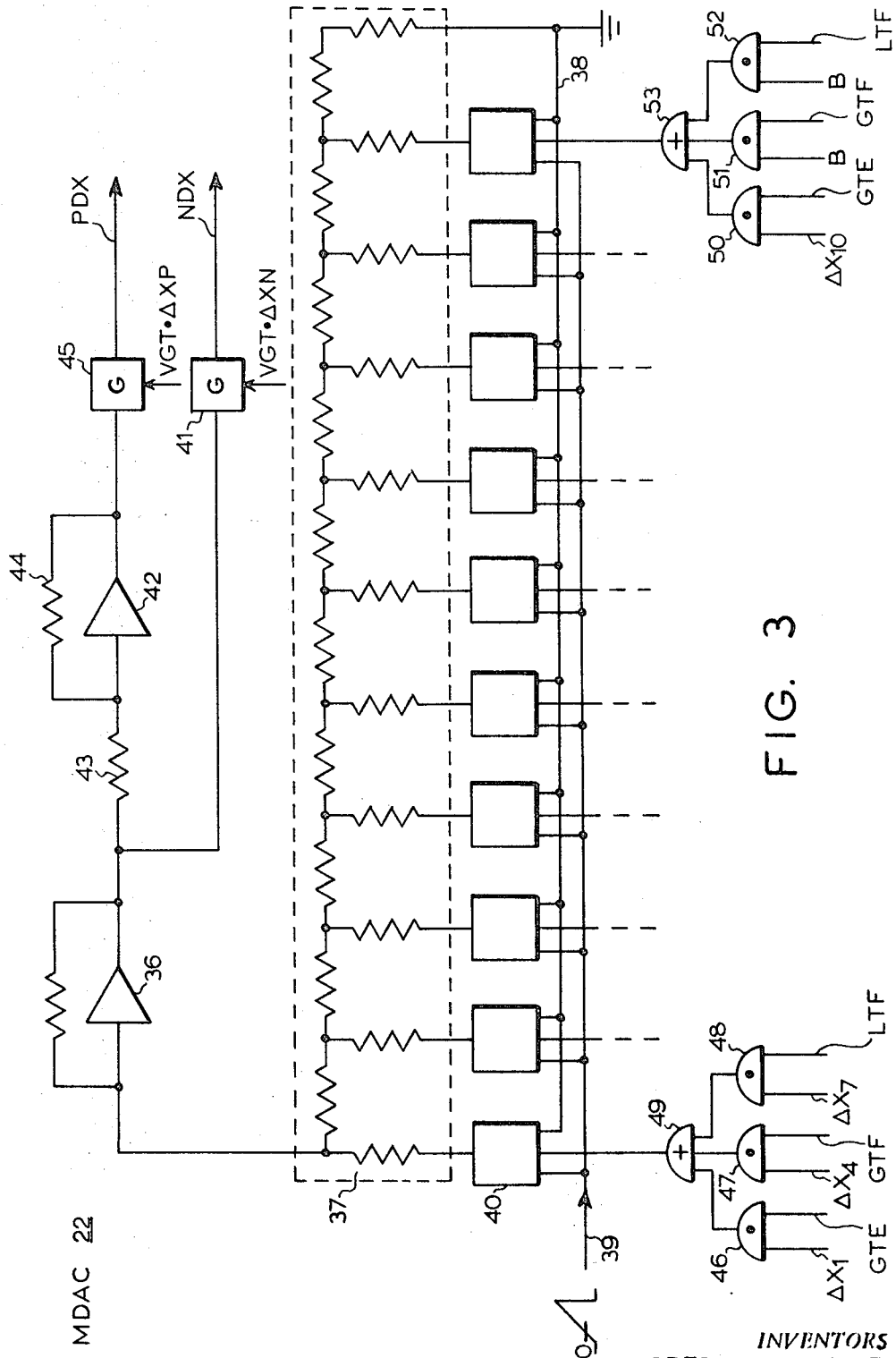
FIG. 3 illustrates schematically an exemplary multiplying digital-to-analog converter for the arrangement of FIG. 1.

A preferred embodiment of a multiplying digital-to-analog converter is illustrated by the MDAC 22 in FIG. 3. However, it should be understood that any multiplying digital-to-analog converter may be employed. The function of an MDAC is to provide an output voltage that is at all times the ramp voltage times a digital input. The conversion is accomplished by a conventional R-2R-type ladder network 37, where each leg of the ladder is connected either to ground through bus 38 or the ramp voltage through a bus 39. This connection is made by circuit, such as a circuit 40 in the most significant bit position, comprising a storage flip-flop (that may be a J-K type but shown as a D-type) and a pair of field-effect transistors (or other suitable switches). Each transistor is driven by a different side of the flip-flop to connect the associated leg of the ladder 37 either to ground if the digit (most significant digit for circuit 40) is zero or to the ramp voltage if the digit is equal to one.

The operational amplifier 36 inverts the output ramp from the ladder 37. Accordingly, it is connected to a negative output terminal NDX by a gate 41 in response to a negative signal for the $\Delta X$ component as represented by a signal VGT. $\Delta XN$ derived from false output terminal of the sign bit position of the $\Delta X$ register and VGT. The gate 41 is preferably a P-channel FET which requires a positive level to turn it off. The output of the operational amplifier 36 is also connected to a second operational amplifier through a summing resistor 43 equal to the feedback resistor 44 of the amplifier. In that manner, a positive ramp is transmitted through a gate 45 when the sign of the $\Delta X$ component is positive as represented by a signal VGT. $\Delta XP$ derived from the true output terminal of the sign bit position and VGT.

Sealing the $\Delta X$ component is preferably accomplished by gating into the circuits of the MDAC 22 the $\Delta X$ digits directly if GTE is true to place the most significant digit $\Delta X$ into the circuit 40, and all of the other digits of successively lower significance into successive circuits to the right of the circuit 40. If GTF is true, the scaling factor is 8, so the fourth most significant digit $\Delta X_4$ is placed in the circuit 40. All other digits of successively lower significance are placed into successive circuits to the right with zeros in the last four circuits on the far right. Similarly, if LTF is true, the scaling factor is 64, so the $\Delta X$ component must be entered into the MDAC 22 effectively shifted six binary places to the left with the fourth most significant digit in the circuit 40 and zeros in the six least significant bit positions. AND gates 46, 47 and 48 and an OR gate 49 illustrate "scaling" by "shifting" for the most significant bit position (circuit 40) of the MDAC 22, and similar gates 50 to 53 illustrate corresponding scaling operations for the least significant bit position where the voltage input B to AND gates 51 and 52 is the voltage level selected to represent binary 0. For "positive logic" gates, a binary 1 is typically represented by +3 volts and a binary 0 by circuit ground potential. Accordingly, for "positive logic" gates the B-input terminals of gates 51 and 52 would be connected to circuit ground.

Once the appropriate one of the gates 41 and 45 has been selected in accordance with the sign of the $\Delta X$ component, and the ramp generator has been turned on by the signal $\overline{VIP}$ being driven false from +3 volts to zero to turn gate 30 of FIG. 2 on, the line drawing operation is initiated. The comparator 35 then triggers a monostable multivibrator RVGT (FIG. 4) which on its trailing edge resets VGT to drive $\overline{VIP}$ true. That turns gate 30 off and thereby terminates the ramp voltage generation. After a fixed delay, the beam is also turned off by resetting flip-flop VIDD (FIG. 4) to allow the CRT blanking signal to come back on.

Figure 4:
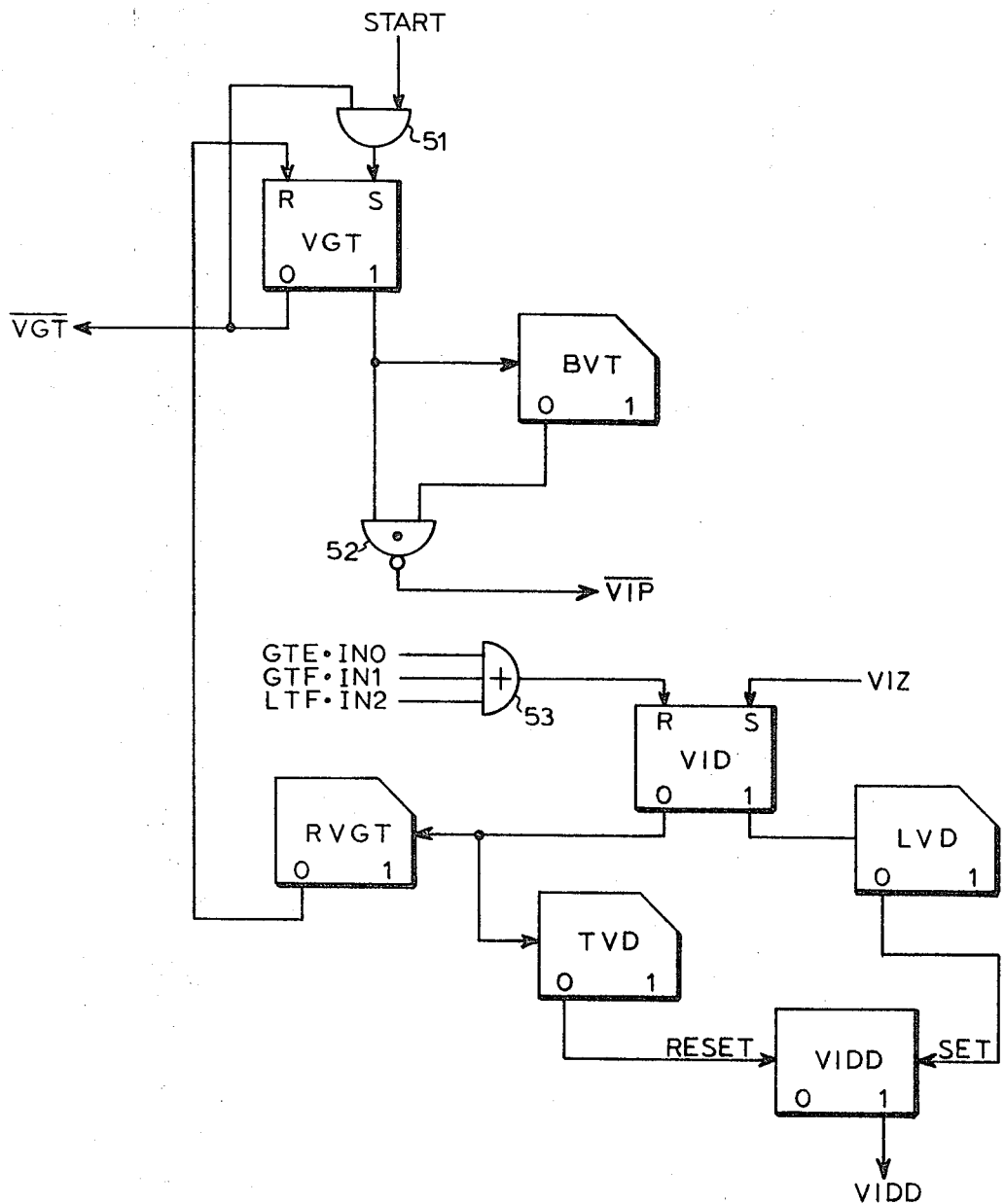
FIG. 4 illustrates schematically a video control network for the arrangement of FIG. 1.

A beam control network 50 (FIG. 1) adapted to turn the video beam off and on by setting and resetting (turning on and off) VIDD will now be described with reference to FIG. 4, but it should be understood that such a control network may be implemented in other ways, and may require modification to meet particular environments and operating requirements of a system in which the present invention is used. At the same time, operation will be summarized for a complete line display cycle.

The asynchronous steps of one display cycle can be broken down into the following (once the $\Delta X$ and $\Delta Y$ registers have been loaded into registers 11 and 12 under control of an external device such as a digit computer).

1. Make the necessary comparisons to generate the appropriate one of the scaling control signals GTE, GTF and LTF and load the MDACs with scaled components $\Delta X$ and $\Delta Y$. Also select the signs of the ramp outputs in response to the signs of the components stored in the registers 11 and 12.

2. Compare the scaled components $\Delta X$ and $\Delta Y$ in the MDAC registers, and gate L and S digits into the ramp voltage generator 21 for the ramp rate selection.

3. Set VGT in response to a START signal from the external device which it transmits after it has loaded the registers and allowed time for the preceding steps. VGT enables MDAC polarity selection and triggers on its leading edge the monostable multivibrator BVT.

4. After a delay set by the monostable multivibrator BVT, the ramp voltage generator is turned on.

5. Turn on video when the ramp voltage crosses zero volts in response to a VIZ signal from the analog comparator 35.

6. Turn off video in response to which ever one of the signals GTE·IN0, GTF·IN1 and LTF·IN2 is transmitted by the analog comparator 35 when the ramp reaches the reference voltage specified by the scaling control signals.

7. Reset the flip-flop VGT and update present position data in the X- and Y-registers.

The foregoing steps are controlled by the beam control unit 50 in response to the START signal. An AND gate 51 locks out other START signals until the entire sequence has been completed and the flip-flop VGT has been reset. The component data $\Delta X$ and $\Delta Y$ may be entered into registers 11 and 12 at the same time the START signal is transmitted to the AND gate 51.

The true output of the flip-flop VGT and the false output of the monostable multivibrator BVT are combined in a NAND gate to drive the signal $\overline{VIP}$ true (+3 volts) for the period of the monostable mutlivibrator BVT. When $\overline{VIP}$ is reset to zero, the ramp generator 21 is turned on. Once the ramp crosses zero, the leading edge of the signal VIZ sets a flip-flop VID which immediately triggers monostable multivibrator LVD. The trailing edge of the output pulse from the monostable multivibrator LVD sets flip-flop VIDD to turn on the beam (i.e. initiate unblanking). Thereafter, when the ramp voltage reaches the selected reference level, the flip-flop VID is reset through an OR gate 53. The step voltage at the false output of the flip-flop VID triggers monostable multivibrator TVD and RVGT. The delay period of the multivibrator TVD is set equal to or greater than delay period of the multivibrator LVD. Thus by adjusting the delay periods of the multivibrators LVD and TVD, the lag of the deflection system is compensated. At some time before, or after, the multivibrator TVD resets, the multivibrator RVGT resets to reset the flip-flop VGT, thereby completing an operation. The advantage of adjusting the delay of multivibrator RVGT to something less than that of multivibrator TVD is that the signal $\overline{VGT}$ can be used to signal the external control device that operation is almost complete so that the device can prepare to transmit new data while the current operation is being completed.

From the foregoing, it may be seen that applicant has invented a new and improved line display system for use with CRTs and similar devices. Although a particular embodiment has been illustrated, and particular techniques of implementation have been described, it should be appreciated that the invention is in no sense limited to that. Accordingly, it is not intended that the scope of the invention be determined by that, but rather by the breadth of the appended claims.

What we claim is:

1. In apparatus for controlling a device to display a straight line from a present position to a new position, where said positions are defined digitally in a rectangular coordinate system, and a given point is displayed on the device in response to a pair of deflection signals proportional to rectangular coordinates of said given point, the combination comprising:

means for converting present position data into first and second analog signals proportional to present position coordinates X and Y;

means for generating a ramp signal;

means for multiplying said ramp signal by the coordinate differences $\Delta X$ and $\Delta Y$ between said present position coordinates and new position coordinates to provide third and fourth analog signals; and means for adding said third and fourth signals to said first and second signals to provide said pair of deflection signals.

2. The combination of claim 1 wherein said ramp signal generating means includes a plurality of capacitors which may be selected for integrating current from a constant source including apparatus for making the ramp rate of said ramp signal approximately inversely proportional to the length of a given line to be displayed by selecting combinations of said capacitors comprising:

means for determining which of the differences $\Delta X$ and $\Delta Y$ is larger, and selecting the larger as a value L in digital form and the other as a value S in digital form;

means for forming a composite group of digital signals by combining with one group of digital signals of said value L, another group of digital signals of said value S; and means for selecting said capacitors in response to said composite group of digital signals, where each of said capacitors selected by a digital signal of said one group of digital signals of said value L is weighted in proportion to the numerical weight of the digital signal by which it is selected, and each of said capacitors selected by a digital signal of said other group of digital signals of said value S is weighted in proportion to approximately 0.375 the numerical weight of the digital signal by which it is selected, thereby maintaining the rate of change of said pair of deflection said pair substantially constant.

3. The combination of claim 2 including means for scaling the coordinate differences $\Delta X$ and $\Delta Y$ before forming said composite group of digital signals, thereby scaling said ramp rate in proportion to scaling of said coordinate differences to reduce the range of ramp rates required for a given range of differences $\Delta X$ and $\Delta Y$.

4. The combination of claim 3 including control means for rendering said device responsive to said deflection signals as said ramp signal starts to increase from zero volts, and means for terminating the response of said device when said ramp reaches a predetermined level.

5. The combination of claim 4 including means for scaling said predetermined level by the reciprocal of a factor by which said differences $\Delta X$ and $\Delta Y$ are scaled for said given line to be displayed.

6. The combination of claim 5 wherein said device employs an electron beam deflection system to display a line in response to said deflection signals, and said control means comprises means for delaying the turning on of said beam for a predetermined time while said ramp signal increases from zero, and means for delaying the turning off of said beam for a predetermined time after said signal reaches said predetermined level, thereby compensating for lag in the response of said deflection system to said deflection signals.

7. The combination of claim 6 including means for initiating said ramp signal at a level below zero.

8. The combination of claim 7 including means for selectively inverting said third and fourth analog signals for negative differences in components $\Delta X$ and $\Delta Y$, respectively before said third and fourth signals are added to said first and second signals to provide said pair of deflection signals.

9. The combination of claim 1 including:
means for scaling the coordinate differences $\Delta X$ and $\Delta Y$ to assure that at least one of the differences will be equal to or greater than a predetermined number;
means for determining the approximate length of a line defined by said scaled differences, and in response thereto for making the ramp rate of said signal inversely proportional to said approximate length;
first control means for rendering said device responsive to said deflection signals when said ramp signal starts to increase from zero volts;
second control means for terminating the response of said device when said ramp reaches a predetermined level; and
means for scaling said predetermined level by the reciprocal of a factor by which said differences $\Delta X$ and $\Delta Y$ are scaled.

10. The combination of claim 9 wherein said devices employs an electron beam deflection system to display a line in response to said deflection signals, including means for initiating said ramp signal at a level below zero.

11. The combination of claim 10 including:
means for delaying said first control means in rendering said device responsive for a predetermined period; and
means for delaying said second control means in terminating the response of said device for a predetermined period;
thereby compensating for lag in the response of said deflection system to said deflection signals.